Jan. 13, 1959   G. K. McKEE   2,868,900
TROLLEY WIRE SLIDE, COLLECTOR OR SHOE
Filed Oct. 10, 1952   4 Sheets-Sheet 4
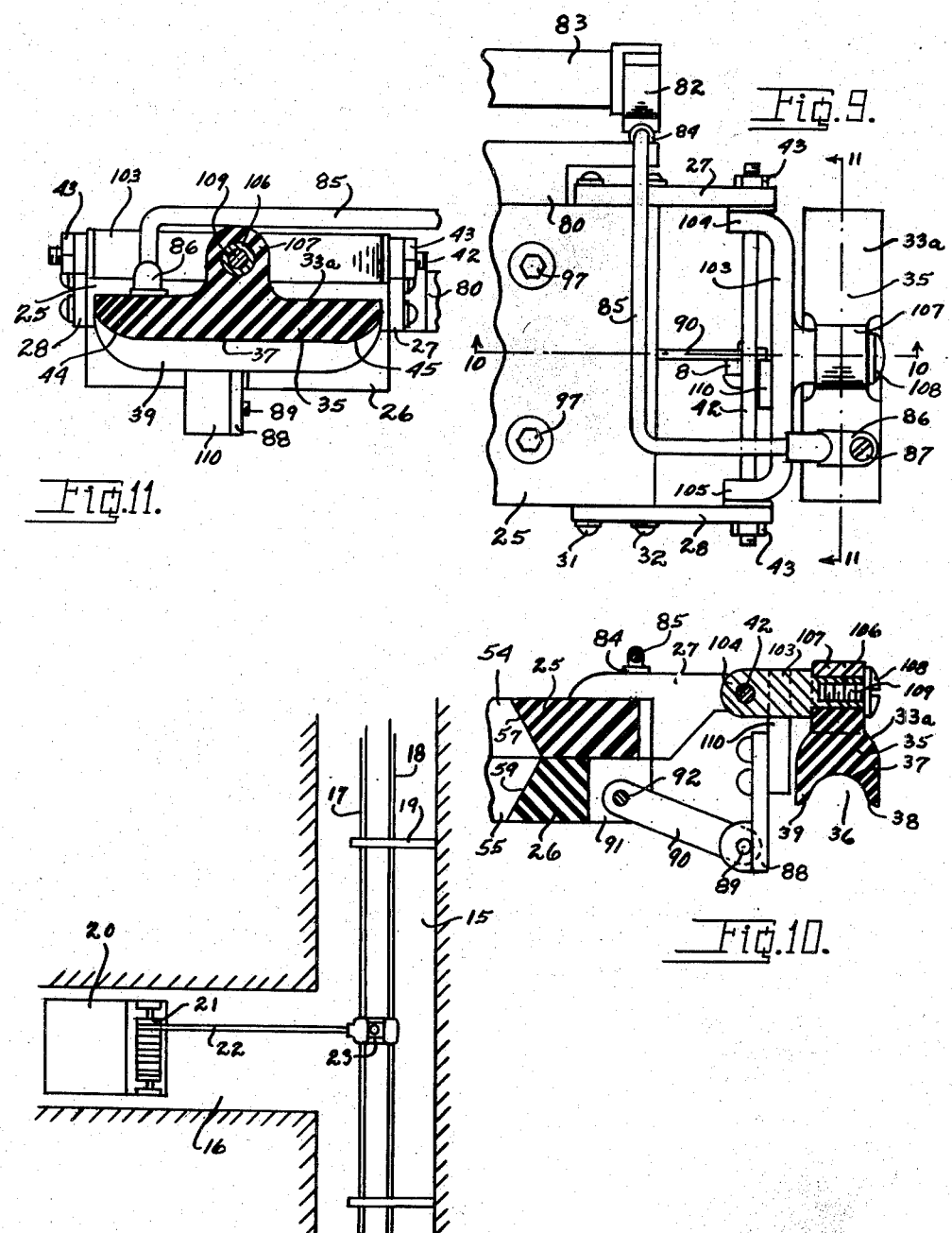
INVENTOR.
GEORGE K McKEE
BY
Joseph A. Rave
Attorney

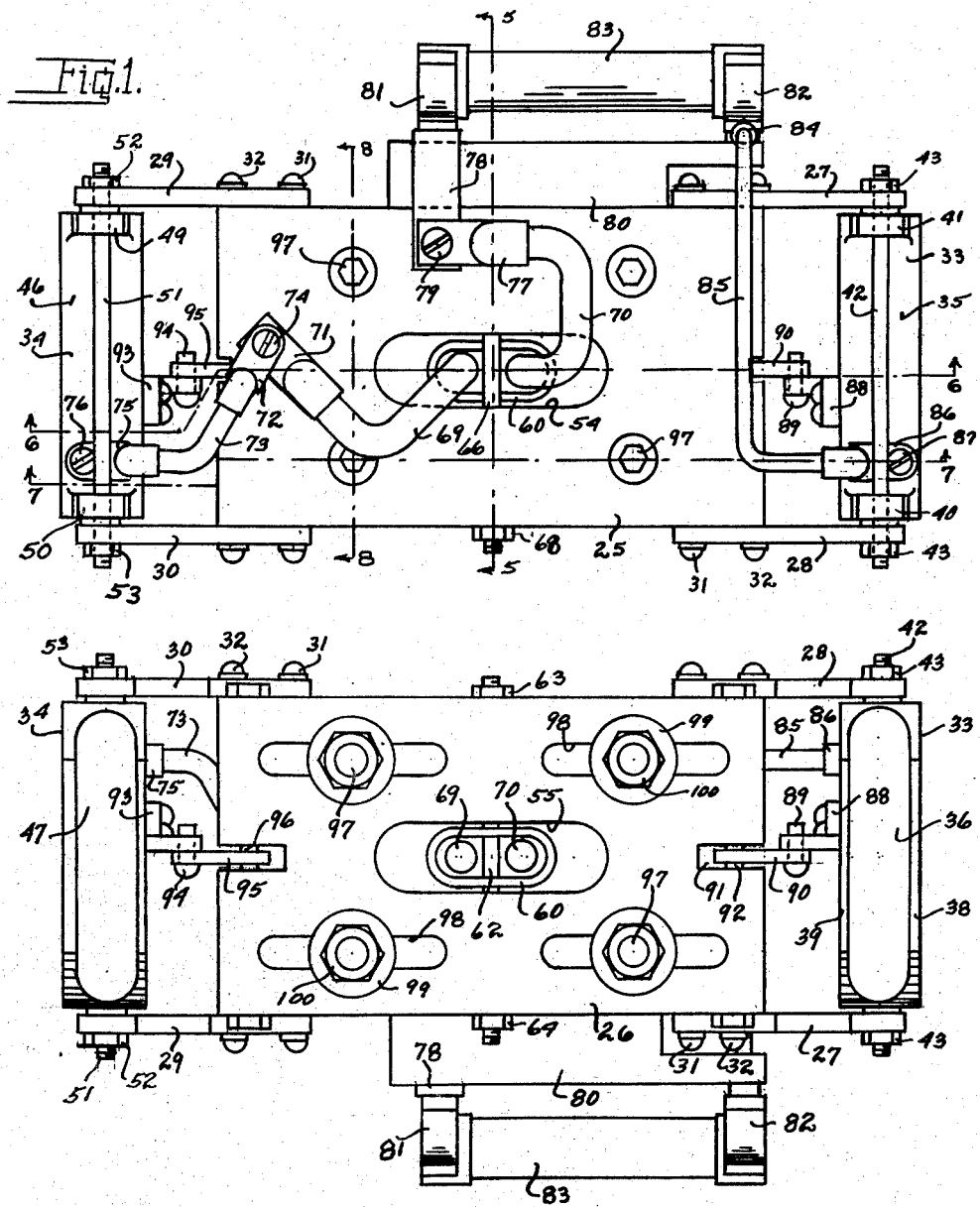

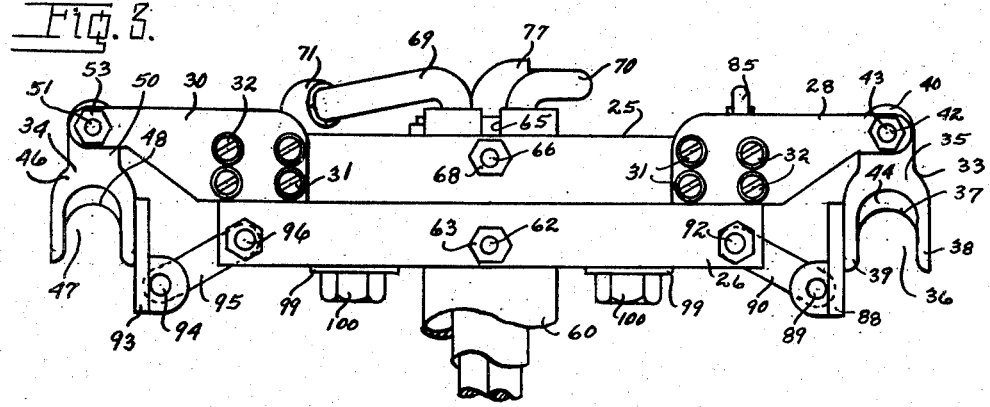
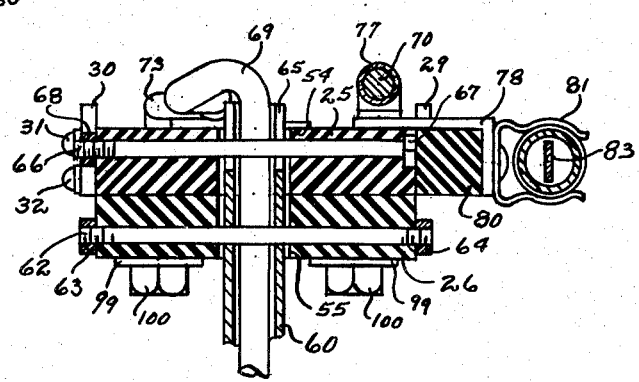

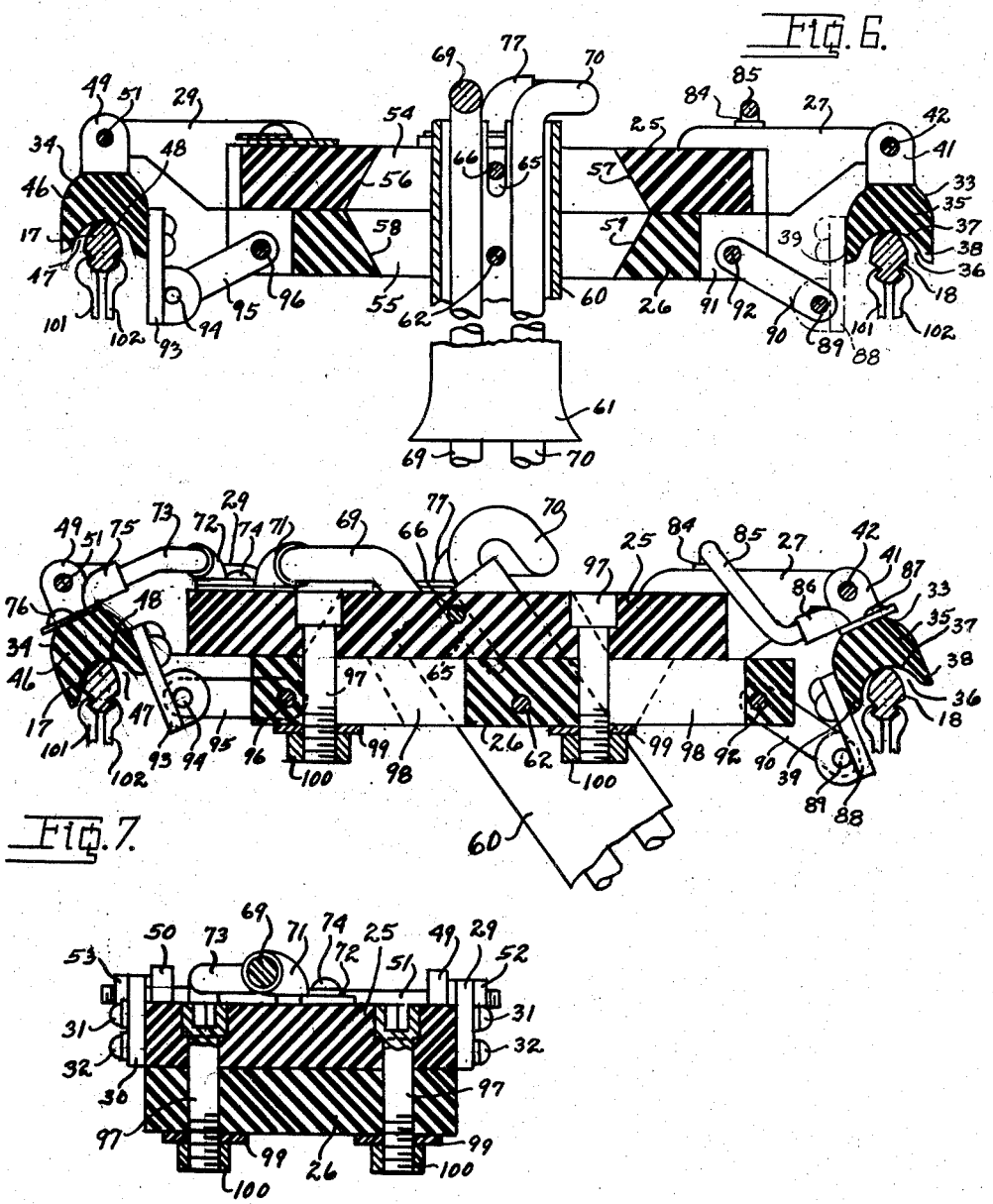

United States Patent Office 2,868,900
Patented Jan. 13, 1959

2,868,900

TROLLEY WIRE SLIDE, COLLECTOR OR SHOE

George K. McKee, Cincinnati, Ohio

Application October 10, 1952, Serial No. 314,185

8 Claims. (Cl. 191—57)

This invention relates to improvements in a trolley wire slide, shoe or collector and particularly to such a device when employed in connection with a two trolley wire system.

While the terms "slide," "shoe" and "collector" are used interchangeably to indicate the contact members with trolley wires, the term "slide" will herein be used to indicate the device as a whole and the term "contact shoe" will be used to indicate the member or members that have actual trolley wire contacts and slides thereon.

The trolley wire slide of the present invention is adapted to be actuated on and relative to the upper surface of the trolley wires as distinguished from devices that contact only the undersurface of the trolley wires.

While the device of the present invention is capable of general application where an electrically powered vehicle runs on a roadway, whether tracked or untracked, the device of the present invention will probably find its principal use in mines. Further, it is contemplated that the slide of the present invention will generally be employed with trackless vehicles, that is vehicles having wheels rubber tired or otherwise that run on a roadway rather than on tracks, it is to be understood that the device is capable of use with vehicles that utilize wheels that operate on tracks set upon or into the roadway and act as directional guides for the vehicle.

One of the contemplated uses of the present invention is with electric powered vehicles operating in mine runs, ways, or the like, off of which extend side runs and in which the mine main run is provided with electric current supplying trolley wires while the side runs are not, and which vehicle may be directed down the side runs by electric current supplied from the current supplying trolley wires in the main run.

In the past, electrically directed vehicles in trackless mine runs received current from cables that were allowed to lie along the ground in the run and were frequently damaged by the vehicle as well as by the material carrying cars which the electric powered vehicle dragged behind it. With the past practice there was also the danger of contact by persons walking in the runs with the damaged cable with injury resulting.

It is therefore, the principal object of the present invention to provide a two wire slide having contacting shoes for the upper surfaces of the trolley wires for supplying current to an electrically driven vehicle.

Another object of this invention is the provision of a slide for accomplishing the foregoing object and which will permit of the vehicle being actuated angularly of the direction of extent of the electric trolley wires.

Another object of this invention is the provision of a two wire slide in which the contacting shoes are capable of swinging movement with respect to the trolley wires to accommodate the movement of the vehicle through paths angularly related to the direction of extent of the trolley wires.

It is also an object of this invention to provide a slide with a contact shoe for each of a pair of trolley wires which are connected with one another so that their position with respect to their individual trolley wires are such that the said contact shoes maintain the proper and desirable contact positions, minimizing displacement thereof regardless of position of the vehicle with respect to said trolley wires.

A further and specific object of the present invention is the provision of a trolley wire slide having a contact shoe for each of a pair of trolley wires interconnected with one another whereby similar angular displacement of said individual contact shoes is effected as determined by the relative position of an electrically powered vehicle with respect to the general extent of the trolley wires.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a top plan view of a trolley wire slide embodying the principles of the present invention.

Fig. 2 is a bottom plan view of the trolley wire slide shown in Fig. 1.

Fig. 3 is a side elevational view of the trolley wire slide shown in Figs. 1 and 2, particularly as seen from the lower end of Fig. 1.

Fig. 4 is an end elevational view of the trolley wire slide as seen from the right-hand end of Fig. 3, a portion being broken away for clearness in illustration.

Fig. 5 is a transverse sectional view through the trolley wire slide as seen from line 5—5 on Fig. 1.

Fig. 6 is a longitudinal sectional view through the trolley wire slide as seen from line 6—6 on Fig. 1.

Fig. 7 is a longitudinal sectional view of the trolley wire slide, similar to Fig. 6, but taken on a plane ahead of Fig. 6 on line 7—7 on Fig. 1 and showing the parts in a second operative position from that of Fig. 6.

Fig. 8 is a transverse sectional view through the trolley wire slide, similar to Fig. 5, but taken on a plane forwardly of that of Fig. 5 on line 8—8 on Fig. 1.

Fig. 9 is a fragmentary top plan view of a portion of Fig. 1 showing a modification in the mounting of the contact shoe.

Fig. 10 is a fragmentary sectional view of the modified trolley wire slide shoe mounting as seen from line 10—10 on Fig. 9.

Fig. 11 is a transverse sectional view through the modified structure of Fig. 9 as seen from line 11—11 on said Fig. 9.

Fig. 12 is a diagrammatic view illustrating the trolley wire slide of the present invention in use.

Throughout the several views of the drawings similar reference characters are employed to denote the same or similar parts.

As noted above, the device of the present invention will find one of its principal uses in mines employing a two trolley wire electrical system for traversing the main mine run and for traversing side or angular runs and in which only the main run is provided with such electric current supplying trolley wires. Such a condition is diagrammatically illustrated in Fig. 12 wherein the main run is indicated by the reference numeral 15 with an angular or side run extending therefrom as at 16. Extending longitudinally of the main run is a pair of trolley wires 17 and 18 which when connected with one another form a complete electrical circuit. The trolley wires 17 and 18 are supported in position by suitable hangers, later to be more specifically referred to, depending from a cross arm 19 which are suitably spaced longitudinally of the main run 15. As is frequently the practice, the trolley wire hangers may be individually mounted in suitable ceiling or roof beams of the main mine run 15. The method or means for mounting the trolley wires forms no part of the present invention and may be made in any suitable or desirable manner.

Disposed to travel on the floor of the mine run 15 as well as any side runs is a vehicle having suitable wheels and an electric motor for driving same and diagrammatically illustrated at 20 in Fig. 12. The vehicle 20 in order to permit it to travel into and through a side run is provided with a reel 21 on which is wound a cable 22 that extends to the trolley wires 17 and 18 for transmitting electric current to the motor, not shown, of the vehicle 20. The means for effecting the connection of the cable 22 with the trolley wires 17 and 18 is a trolley wire slide diagrammatically illustrated in Fig. 12 and indicated by the reference numeral 23. It is this trolley wire slide that forms the subject matter of the present invention and two forms of which are illustrated in the other views of the drawings. It should be noted that the cable 22 is in reality a pair of flexible cables or wires insulated from one another and conveniently enclosed in a common sheath and respectively connected with a trolley wire 17 or 18 through the slide 23.

Referring now to Figs. 1 to 8, inclusive, and one specific form of the invention, the slide comprises a pair of plate members, an upper plate 25 and a lower plate 26, in face sliding contact. The said plates are formed of electric current insulating material or are provided between them with electric insulation so that there is no electric short possible across them. The upper plate 25 has secured to each of its corners a projecting bracket 27, 28, 29 and 30, each, respectively, secured by screws 31 and 32 to the said plate. The brackets 27 and 28 cooperating with one another for supporting between them a trolley wire contact shoe 33 while the brackets 29 and 30 similarly cooperate with one another for supporting a second trolley wire contact shoe 34.

The relative position of the parts in Fig. 12 and in Fig. 1 indicates that contact shoe 33 would engage the upper surface of trolley wire 18 while contact shoe 34 would engage the upper surface of trolley wire 17.

The contact shoe 33 comprises a body portion 35 of a suitable or accepted length for proper electrical contact and is provided longitudinally thereof with an upwardly extending groove 36 whose base is curved or arcuately formed as at 37 in Figs. 6 and 7. By this construction the shoe is provided with depending flanges 38 and 39 to flank the opposite sides of the trolley wire 18. Adjacent to or near its opposite ends and upwardly projecting from the body portion 35, the contact shoe 33 is provided with apertured ears 40 and 41 with their apertures in alignment with similar apertures in the ends of brackets 27 and 28 and with an axle or trunnion 42 extending through said aligned apertures. The axle 42 is retained in operative position by any suitable or desirable means such as the nuts 43 threadedly mounted on opposite ends thereof.

From the foregoing, it will be noted that the contact shoe 33 is capable of oscillating or swinging movement with or about the axis of the shaft 42 and a movement that will be imparted thereto as will be subsequenlty pointed out.

The trolley wire slide is operable in opposite directions on the trolley wires 17 and 18 and in order that the sliding movement may be effected with the least amount of drag the opposite ends of the base 37 of the groove 36 is rounded as clearly illustrated in Fig. 4 and indicated by reference characters 44 and 45.

The contact shoe 34 is substantially identical with contact shoe 33 and includes a body portion 46 upwardly grooved as at 47 with the base of the groove transversely arched as at 48 and having the ends of the base 48 rounded at its opposite ends. Upwardly projecting from the body portion 46 the shoe 34 is provided adjacent to or near its ends with apertured ears 49 and 50 with said apertures in alignment with apertures near the ends of the brackets 29 and 30 and with an axle or journal 51 extending through said aligned apertures. The axle 51 is retained in position by suitable nuts 52 and 53 threaded onto the projecting ends thereof.

The upper plate 25 is provided substantially thereof with an elongated aperture 54 in alignment with a similar elongated aperture 55 substantially centrally of the lower plate 26. For a purpose subsequently to be made clear, the ends of the aperture 54 downwardly and outwardly flare as at 56 and 57 while the ends of the aperture 55 oppositely, or upwardly and outwardly, flare as at 58 and 59. Disposed in said aligned apertures 54 and 55 is a tubular handle member 60 through which the device as a whole is handled for placing the same on the trolley wires 17 and 18 and through which the plates 25 and 26 are actuated in accordance with the direction of pull on the trolley wire slide for correspondingly angularly positioning the contact shoes 33 and 34. The handle member 60 may conveniently take the form of a tube having its upper end flattened to an oval shape for a length to pass through the plates' elongated apertures 54 and 55, as most clearly illustrated in Figs. 1 and 2, and is of a total length to project below the trolley wire slide an amount whereby it may be conveniently handled. In order to assist in preventing the operator or user's hand from sliding off of the handle member the lower end may be flared as at 61 against which the side of the operator's hand rests.

The handle member 60 is provided through the portion thereof that passes through the lower plate 26 with an aperture in alignment with a corresponding aperture in the said lower plate 26, on opposite sides of its aperture 55, and extending through said aligned apertures is a rod or pivto shaft 62 retained in position by nuts 63 and 64 threaded onto the portions of said pivot shaft 62 that project beyond opposite sides of the plate 26. The upper end of the handle 60 is provided with a slot 65 through which extends a shaft or pivot rod 66 carried by the upper plate 25 and which rod or pivot shaft 66 is retained in position by a head 67 on one end thereof embedded in the plate 25 and by a nut 68 threaded on a projecting portion of the rod or shaft 66, see Fig. 5. The purpose for this construction is to longitudinally slidably shift the plates 25 and 26 in the act of effecting the angular positioning of the contact shoes 33 and 34 and will be presently made clear.

The handle member 60 in addition acts as a sheath or conduit for flexible cables 69 and 70 which, as noted above, for the flexible cable 22 that extends to the vehicle reel 21. The ends of the cables 69 and 70 are respectively connected with the contact shoes 34 and 33 as will now be described.

The cable 69, see particularly Fig. 1, has at its end a suitable connector 71 in electrical contact with a second connector 72 at one end of a short flexible cable or wire 73. The connector 71 and 72 are held in electrical contact with one another and are anchored to the upper surface of the block 25 by a screw 74. The other end of the short cable or wire 73 is provided with a connector 75 which through a screw 76 is secured in electrical contact with the contacting shoe 34. For obvious reasons as will be clear, the said short cable or wire 73 is extremely flexible in nature as is the cable 69.

The flexible cable 70 has at its end an electrical connector 77 in electrical contact with a strap 78 through a screw 79. The screw 79 in addition to securing the connectors 77 and 78 to one another also secures these parts to the upper plate 25. The strap 78 is employed, in part, for securing to the plate 25 a block 80 which carries on its outer surface clips for a fuse. This specific arrangement is for convenience only since the fuse and its clips could be attached directly to one edge of the plate 25. Accordingly, the strap 78 has in electrical contact therewith a spring clip 81 that cooperates with a second spring clip 82, secured to the other end of the block 80, for supporting a replaceable fuse 83. The spring clip 82 is in electrical contact with a connector 84 attached to one end of a flexible cable 85, flexible cable 85 is similar in all respects to the flexible cable 73 and has at its other end a second connector 86 secured by screw 87 in engagement with the contact shoe 33. The flexible cable 85 is, similar to cable 73, extremely flexible in nature.

From the foregoing it will be now evident that the trolley wire slide has its contacting shoes in simultaneous sliding engagement with the trolley wires 17 and 18 for causing a current flow through the composite cable 22 to the reel 21 and motor of the vehicle 20.

As illustrated in Fig. 6 and with the vehicle moving longitudinally of the main mine run 15 the pull on the trolley wire slide is substantially downwardly against the said trolley wires 17 and 18 in the direction of extent of said wires and which trolley wires may have any suitable or acceptable cross-section, such as that illustrated in the drawings. Regardless of the cross-section of the trolley wire they are provided with an upper rounded surface which is contacted by the base of the grooves in the contact shoes 33 and 34 and it is on this surface that the contact shoes laterally roll or slide when a lateral pull is effected, as when the vehicle moves into and through a side run such as 16 in Fig. 12. It is also desired that the force across or through the wire be in the direction of said pull wherefore the mechanism presently to be described rocks or oscillates the said contact shoes.

As seen particularly in Figs. 6 and 7 the contact shoe 33 has secured to its inner flange 39 a bracket 88 to which is pivoted, as at 89, one end of a link 90 which has its other end disposed in a slot 91 in the lower plate 26. A pivot rod 92 extends through said lower plate 26 to have pivotally connected therewith the inner end of the link 90.

The contact shoe 34 is provided with a substantially identical mechanism including a bracket 93 secured to the contact shoe inner flange and with the bracket 93 pivoted at 94 to a link 95 which in turn is pivoted at 96 to the other end of the lower plate 26. By this arrangement, any longitudinal movement imparted to the plates 25 and 26 is likewise imparted to the contact shoes 33 and 34.

As illustrated in Fig. 7 the handle-sheath 60 having been moved to the right, due to the vehicle 20 moving through an angular run, as when the vehicle would move into a side run to the right of the main run, through the pivot rods or bolts 62 and 66 reversely longitudinally shifts the plates 25 and 26 on one another for thereby inclining the contact shoes in a direction similar to the direction of extent of the said handle-sheath 60 and the cables 69 and 70 therein. By this construction the pull in the axial direction of the handle 60 will likewise be across the trolley wires 18 and 17 so as to maintain the most efficient contact between said contact shoes and trolley wires.

It will be appreciated that the movement of the upper and lower plates relative to one another must be limited and at the same time the plates retained in proper relation to one another. Any suitable or desirable means may be employed for accomplishing this result. The means for connecting the plates to one another and for limiting the movement of the plates relative to one another, as disclosed in the drawings, comprises a plurality of bolts 97 each of which is anchored in the upper plate 25 to depend therefrom through an elongated aperture 98 in the bottom plate 26. Each of the bolts 97 projects below the lower plate 26 to receive a washer 99 and a nut 100 which secures the plates to one another in sliding engagement and the bolts upon engagement with the ends of the elongated apertures 98 limiting the said sliding movement.

From the foregoing it will now be appreciated that there has been provided a two wire trolley slide with a contact shoe for each trolley wire of a two trolley wire system which is particularly adapted for movement on the upper surface of the trolley wire in the direction of extent of said trolley wires. At the same time the slide may be stopped at any point on the wires to permit the electric powered vehicle to move angularly of the direction of extent of the trolley wires with the contacting shoes taking the position on the trolley wire for providing the most efficient contact between them and at the same time directing the pull through the shoes on said wire directly through the wire and not laterally of the wire as would be the case if an angular movement of the vehicle were attempted with the parts in the position of Fig. 6. It should be noted that in Fig. 7 a rather extreme condition is illustrated with the plates 25 and 26 moved to their limit as permitted by the engagement of the bolts 97 with the ends of elongated apertures 98. It should also be noted that while the plates are illustrated as shifted to permit the vehicle to move to the right, the said plates are shiftable to a position substantially opposite to that illustrated as when the vehicle is moving to the left, such as diagrammatically illustrated in Fig. 12.

As noted above, any suitable or acceptable means may be employed for supporting the trolley wires 17 and 18. As shown in the drawings, Figs. 6 and 7, the means would include a pair of jaws 101 and 102 for engaging the trolley wire in such a position as to have the upper surface thereof exposed for engagement with the contact shoes. Modern practice supplies the trolley wires with a groove running longitudinally of each side of and above or below the axial center of the trolley wire thereby providing a rib on the trolley wire to be engaged by the hanger clamp jaws; the clamping rib installations embodying the trolley slide of the present invention would be on the bottom of the trolley wire, and which construction is illustrated in the drawings, particularly Figs. 3, 6 and 7.

Under certain conditions it may be desirable to have the contact shoes swing or oscillate in a plane vertically of the trolley wires as well as swing or oscillate about the axis of said trolley wires. The modification illustrated in Figs. 9, 10 and 11 provides a structure for so functioning.

The modification instead of having the shoes mounted directly between brackets 27 and 28 or 29 and 30 shows one of the shoes as mounted on a hanger which in turn is mounted between the above enumerated brackets. In these Figs. 9, 10 and 11 only one contact shoe 33a is illustrated but it is to be understood that a similarly mounted shoe may be employed for the contact shoe 34.

Specifically, in the modification, use is made of a hanger 103 having at its ends rearwardly projecting ears 104 and 105 each suitably apertured for alignment with the apertures in brackets 27 and 28 and through which aligned apertures extends the pivot rod or shaft 42. Extending forwardly of the hanger 103 is a journal stud 106 received in a suitable aperture in an upstanding ear or lug 107 located substantially centrally, longitudinally, and transversely of the shoe 33a. The shoe 33a is retained on the journal stud 106 by the head 108 of a bolt 109 screwed into the said journal stud 106.

The shoe 33a is substantially otherwise identical with the shoe 33 having longitudinally thereof the groove 36 with its arcuate base 37 for contact with the trolley wire. Flanking the groove 36 the shoe is provided with depending flanges 38 and 39.

In the modification the means for effecting swinging movement or oscillation of the contact shoe around the axis of the trolley wire, while substantially identical with that above described, is not secured directly to the contact shoe but instead is secured to the hanger 103 for oscillating the same and thereby the shoe about the pivot rod or bar 42. Accordingly, the said hanger 103 has depending from it a lug 110 to which is secured the bracket 88 having pivoted thereto the link 90 which is in turn pivoted to the lower plate 26.

It will be appreciated that movement of the upper and lower plates 25 and 26 longitudinally of one another will oscillate the hanger 103 in the same manner and to the same degree that the contact shoes 33 and 34 are moved or oscillated. It will also be noted that the contact shoe 33a may be oscillated or moved on the trunnion 106 in a plane directly vertically of the trolley wire.

In view of the foregoing, it is believed now evident that the slide of the present invention accomplishes the objects initially set forth.

What is claimed is:

1. In a two trolley wire electric current collecting slide the combination of a supporting plate, mounting brackets carried by said supporting plate adjacent its ends, a contact shoe carried by the brackets beyond the supporting plate each for sliding engagement with the upper surface of a trolley wire, a cable from each contact shoe passing through an aperture centrally of the plate, said mounting brackets for the contact shoes including a pivot so that said shoes may be oscillated relative to their brackets, said electric cables depending below the plate and to be downwardly angularly disposed in a direction transversely of the trolley wires, means associated with said supporting plate for effecting simultaneous oscillation of the contact shoes, including a second plate associated with the supporting plate for movement relative to one another, said second plate having a central aperture through which the cables pass and said plates being movable by the cables when downwardly angularly disposed, means connecting said second plate and contact shoes so that movement of said plates relative to one another oscillates the contact shoes, and means limiting the movement of said plates relative to one another and the oscillation of the contact shoes.

2. In a two trolley wire electric current collecting slide the combination of a supporting plate, mounting brackets carried by said supporting plate adjacent its ends, a contact shoe carried by the brackets beyond the supporting plate each for sliding engagement with the upper surface of a trolley wire, a cable from each contact shoe passing through an aperture centrally of the plate, said mounting brackets for the contact shoes including a pivot so that said shoes may be oscillated relative to their brackets, said electric cables depending below the plate and to be downwardly angularly disposed in a direction transversely of the trolley wires, means associated with said supporting plate for effecting simultaneous oscillation of the contact shoes, including a second plate associated with the supporting plate for movement relative to one another, means limiting the movement of said plates relative to one another, said second plate having a central aperture through which the cables pass and said plates being movable by the cables when downwardly angularly disposed, and a link pivotly connected with each contact shoe and with the second plate so that relative movement of said second plate and supporting plate to one another effects the contact shoes oscillation.

3. In a two trolley wire electric current collecting slide the combination of a supporting plate, mounting brackets carried by said supporting plate adjacent its ends, a contact shoe carried by the brackets beyond the supporting plate each for sliding engagement with the upper surface of a trolley wire, a cable from each contact shoe passing through an aperture centrally of the plate, said mounting brackets for each contact shoe with the supporting plate including a hanger on which the contact shoes are trunnioned for oscillation in a vertical plane in the direction of extent of its trolley wire, said mounting brackets each including a pivot shaft on which said hangers are mounted so that said contact shoes may be oscillated in a second vertical plane transversely of the trolley wire, said electric cables depending below the plate and to be downwardly angularly disposed in a direction transversely of the trolley wires, a handle associated with said supporting plate through which said contact shoes cables pass and said handle being operable for downwardly angularly disposing the contact shoes cables and effecting simultaneous oscillation of the hangers and contact shoes transversely of the trolley wires, including a second plate associated with the supporting plate for movement relative to one another, and means connecting said second plate and hangers so that movement of said plates relative to one another oscillates the hangers and contact shoes carried thereby.

4. In a two trolley wire electric current collecting slide the combination of a pair of plates, an upper plate and a lower plate each centrally apertured with their apertures in axial alignment, a contact shoe beyond the ends of the plates each adapted for sliding engagement with the upper surface of a trolley wire, means from the upper plate for oscillatably securing the contact shoes thereto, means from the lower plate connected with the shoes for preventing independent oscillation thereof, a cable from each contact shoe passing through the plates apertures to depend below the plates and to be downwardly angularly disposed in a direction transversely of the trolley wires, and means connecting the upper and lower plates to one another operative by the cables when downwardly angularly disposed for effecting relative independent movement of the plates and thereby effecting simultaneous oscillation of the contact shoes, and means for limiting the oscillation of the contact shoes.

5. In a two trolley wire electric current collecting slide the combination of a pair of plates, an upper plate and a lower plate each centrally apertured with their apertures in axial alignment, a contact shoe beyond the ends of the plates each adapted for sliding engagement with the upper surface of a trolley wire, means from the upper plate for oscillatably securing the contact shoes thereto, means from the lower plate connected with the shoes for preventing independent oscillation thereof, a cable from each contact shoe passing through the plates apertures to depend below the plates and to be downwardly angularly disposed in a direction transversely of the trolley wires, means connecting the upper and lower plates to one another operative by the cables when downwardly angularly disposed for effecting relative independent movement of the plates and thereby effecting simultaneous oscillation of the contact shoes, and means limiting the relative independent movement of the plates.

6. In a two trolley wire electric current collecting slide the combination of a pair of plates, an upper plate and a lower plate each centrally apertured with their apertures in axial alignment, a contact shoe beyond the ends of the plates each adapted for sliding engagement with the upper surface of a trolley wire, means from the upper plate for oscillatably securing the contact shoes thereto, means from the lower plate connected with the shoes for preventing independent oscillation thereof, a cable from each contact shoe passing through the plates apertures to depend below the plates and to be downwardly angularly disposed in a direction transversely of the trolley wires, means connecting the upper and lower plates to one another operative by the cables when downwardly angularly disposed for effecting relative independent movement of the plates and thereby effecting simultaneous oscillation of the contact shoes, means for limiting the oscillation of said shoes, and means limiting the relative independent movement of the plates, said means for effecting the plates relative movement including a substantially tubular handle member projecting through the plates aligned apertures and through which the cables pass, means pivotly connecting the handle member to one of said plates, and additional means for slidably pivotly connecting the handle member with the other of said plates.

7. In a two trolley wire electric current collecting slide the combination of an upper and a lower plate superimposed on one another for longitudinal relative movement with each plate centrally apertured and said apertures in alignment, means for connecting said plates to one another for independent movement and for limiting said movement, a contact shoe outwardly of said plates, brackets from the ends of the upper plate, a hanger pivotly mounted on the brackets at each end of said upper plate for oscillating movement in a direction longitudinally of the plates, a trunnion from each hanger on which is oscillatably mounted one of the contact shoes for movement with said hanger and for independent movement in a plane transversely of the plates, means connecting each hanger independently of the plates, means disposed in the plates central aperture pivotly connected with each plate for effecting sliding movement of the plates longitudinally of one another and oscillation of the hangers and contact shoes in the direction longitudinally of the plates, and a cable from each contact shoe.

8. In a two trolley wire electric current collecting slide the combination of an upper and a lower plate superimposed on one another for longitudinal relative movement with each plate centrally apertured and said apertures in alignment, means for connecting said plates to one another for independent movement and for limiting said movement, a contact shoe outwardly of said plates, brackets from the ends of the upper plate, a hanger pivotly mounted on the brackets at each end of said upper plate for oscillating movement in a direction longitudinally of the plates, a trunnion from each hanger on which is oscillatably mounted one of the contact shoes for movement with said hanger and for independent movement in a plane transversely of the plates, means connecting each hanger with the lower plate for prohibiting movement of the hanger independently of the plates, means disposed in the plates central aperture pivotly connected with each plate for effecting sliding movement of the plates longitudinally of one another and oscillation of the plates, and a cable from each contact shoe, said cables being adapted to depend below the plates and to extend downwardly and angularly of the plates in the direction longitudinally of the plates, and said plates sliding means being substantially tubular and having extending therethrough the contact shoe cables so that downward angular projection of the cables correspondingly angularly positions the plates tubular sliding means and automatically slidably adjusts the plates positions and oscillation of the contact shoe hangers.

References Cited in the file of this patent

UNITED STATES PATENTS

| | | | |
|---|---|---|---|
| 588,890 | Wetmore | Aug. 24, | 1897 |
| 970,981 | Blackstone | Sept. 20, | 1910 |
| 1,027,090 | Waxbom | May 21, | 1912 |
| 1,817,093 | Morgan | Aug. 4, | 1931 |
| 2,120,775 | Bogardus | June 14, | 1938 |
| 2,147,460 | Schaake | Feb. 14, | 1939 |
| 2,245,507 | Szalay | June 10, | 1941 |
| 2,610,263 | Tong et al. | Sept. 9, | 1952 |